(12) United States Patent
Pandey

(10) Patent No.: US 10,324,819 B1
(45) Date of Patent: Jun. 18, 2019

(54) RUNTIME PERFORMANCE INTROSPECTION

(71) Applicant: Oracle International Corporation, Redwood Shores, CA (US)

(72) Inventor: Pradip Kumar Pandey, Parker, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/877,253

(22) Filed: Jan. 22, 2018

(51) Int. Cl.
| G06F 9/44 | (2018.01) |
| G06F 11/34 | (2006.01) |
| G06F 11/07 | (2006.01) |
| G06F 8/41 | (2018.01) |

(52) U.S. Cl.
CPC ........ *G06F 11/3466* (2013.01); *G06F 8/4441* (2013.01); *G06F 11/0778* (2013.01); *G06F 11/0784* (2013.01); *G06F 2201/86* (2013.01)

(58) Field of Classification Search
CPC .............. G06F 8/4441; G06F 11/0778; G06F 11/0784; G06F 11/3466; G06F 2201/86
USPC ................................................. 717/127–133
See application file for complete search history.

(56) References Cited

U.S. PATENT DOCUMENTS

| 6,681,387 B1 | 1/2004 | Hwu et al. |
| 7,117,197 B1 | 10/2006 | Wong et al. |
| 7,127,448 B1 | 10/2006 | Wong |
| 7,555,645 B2 | 6/2009 | Vissapragada |
| 7,814,075 B2 | 10/2010 | Sack et al. |
| 8,204,861 B2 | 6/2012 | Sondhi et al. |
| 8,365,198 B2 * | 1/2013 | Duffy ...................... G06F 13/24 717/127 |

(Continued)

FOREIGN PATENT DOCUMENTS

| CN | 101604287 A | 12/2009 |
| CN | 101510115 B | 9/2011 |

OTHER PUBLICATIONS

Joseph Ruzzi, "Oracle Coherence—Developer's Guide", Release 3.6.1, 2010, Oracle and/or its affiliates, 746 pages. (Year: 2010).*

(Continued)

*Primary Examiner* — Ted T. Vo
(74) *Attorney, Agent, or Firm* — Invoke

(57) ABSTRACT

Operations include diagnosing performance hotspots with minimal performance impact. A system selectively extracts a subset of in-memory application data, for failure analysis, based on application metadata associated with an application. The selective data extraction may be used to generate succinct reports that are customized to explore the specific vulnerabilities of each particular application. Application metadata identifies application data attributes for value extraction. The application metadata may identify, for example, a client attribute which indicates the client which requested the execution of a failed operation (or execution of an operation with a failed sub-function). The application metadata may identify a particular function, associated with an operation, that is to be analyzed in case of operation failure. The application metadata may identify a thread-local variable of a thread, executing an operation, that is to be analyzed in case of operation failure.

19 Claims, 6 Drawing Sheets

(56) References Cited

U.S. PATENT DOCUMENTS

| | | | | |
|---|---|---|---|---|
| 8,639,991 | B2* | 1/2014 | Klein | G06F 11/0757 |
| | | | | 714/25 |
| 8,694,706 | B2* | 4/2014 | Dice | G06F 9/526 |
| | | | | 710/200 |
| 8,863,091 | B2* | 10/2014 | Dageville | G06F 11/3636 |
| | | | | 717/124 |
| 8,996,916 | B2* | 3/2015 | Huang | G06F 11/0748 |
| | | | | 714/27 |
| 9,280,438 | B2 | 3/2016 | Indukuro et al. | |
| 9,355,126 | B2 | 5/2016 | Wong | |
| 9,501,346 | B2 | 11/2016 | Hanckel et al. | |
| 9,740,474 | B2* | 8/2017 | Hu | H04L 67/34 |
| 9,742,624 | B2 | 8/2017 | Hanckel et al. | |
| 2007/0112871 | A1 | 5/2007 | Mulagund et al. | |
| 2013/0283249 | A1 | 10/2013 | Kanhere et al. | |
| 2015/0207709 | A1 | 7/2015 | Hanckel et al. | |
| 2016/0098341 | A1 | 4/2016 | Pho et al. | |

OTHER PUBLICATIONS

Carrozza et al., "Operating System Support to Detect Application Hangs", 2008, International Workshop on Verification and Evaluation of Computer and Communication Systems, 11 pages. (Year: 2008).*

Mos, Adrian and Murphy, John, A Framework for Adaptive Monitoring and Performance Management of Component-Based Enterprise Applications, Aug. 2004. pp. 1-209. Ph.D Thesis, Dublin City University, Dublin, Ireland. Available at https://pdfs.semanticscholar.org/8d6a/d3c89514f7ca94dfe33fdc39318e0af1d435.pdf.

* cited by examiner

| Threads 302 | Item 304 | | Quantity 306 | |
|---|---|---|---|---|
| T1 | 1A | Pencil | 1B | 100 |
| T2 | 2A | Stapler | 2B | 50 |
| T3 | 3A | Paper | 3B | 500 |
| T4 | 4A | Staples | 4B | 750 |
| T5 | 5A | Pen | 5B | 50 |
| T6 | 6A | Toner | 6B | 5 |
| T7 | 7A | Pen | 7B | 200 |
| T8 | 8A | Clipboard | 8B | 50 |

FIG. 3

| BSFN Execution Time Threshold | 402 |
|---|---|

| | |
|---|---|
| INI Filename<br>    /u01/jde920/e920/ini/JDE.INI | 404 |
| INI Section Name<br>    DEBUG | 406 |
| INI Entry<br>    BSFNExecutionTimeThreshold | 408 |
| Default Value<br>    0 | 410 |
| When this setting has a value greater than 0, any E1 Server process that executes a BSFN that equals or exceeds this value will log a message to the jde log of the E1 Server process. The log message will contain the E1 user that executed the BSFN and the level. | 412 |

FIG. 4A

| Query Execution Time Threshold | 414 |
|---|---|

| | |
|---|---|
| INI Filename<br>    /u01/jde920/e920/ini/JDE.INI | 416 |
| INI Section Name<br>    DB SYSTEM SETTINGS | 418 |
| INI Entry<br>    QueryExecutionTimeThreshold | 420 |
| Default Value<br>    0 | 422 |
| When this setting has a value greater than 0, any E1 Server process that executes a query that equals or exceeds this value will log a message to the jde log of the E1 Server process. The log message will contain the E1 user and DB proxy user that executed the query and the SQL query itself. | 424 |

FIG. 4B

| Metadata Execution Time Threshold | 426 |
|---|---|
| INI Filename  /u01/jde920/e920/ini/JDE.INI  428 | |
| INI Section Name  430  METADATA | |
| INI Entry  432  ExecutionTimeThreshold | |
| Default Value  434  0 | |
| When this setting has a value greater than 0, any Metadata kernel process that equals or exceeds this value 436 will log a message to the jde log of the Metadata kernel process. | |

FIG. 4C

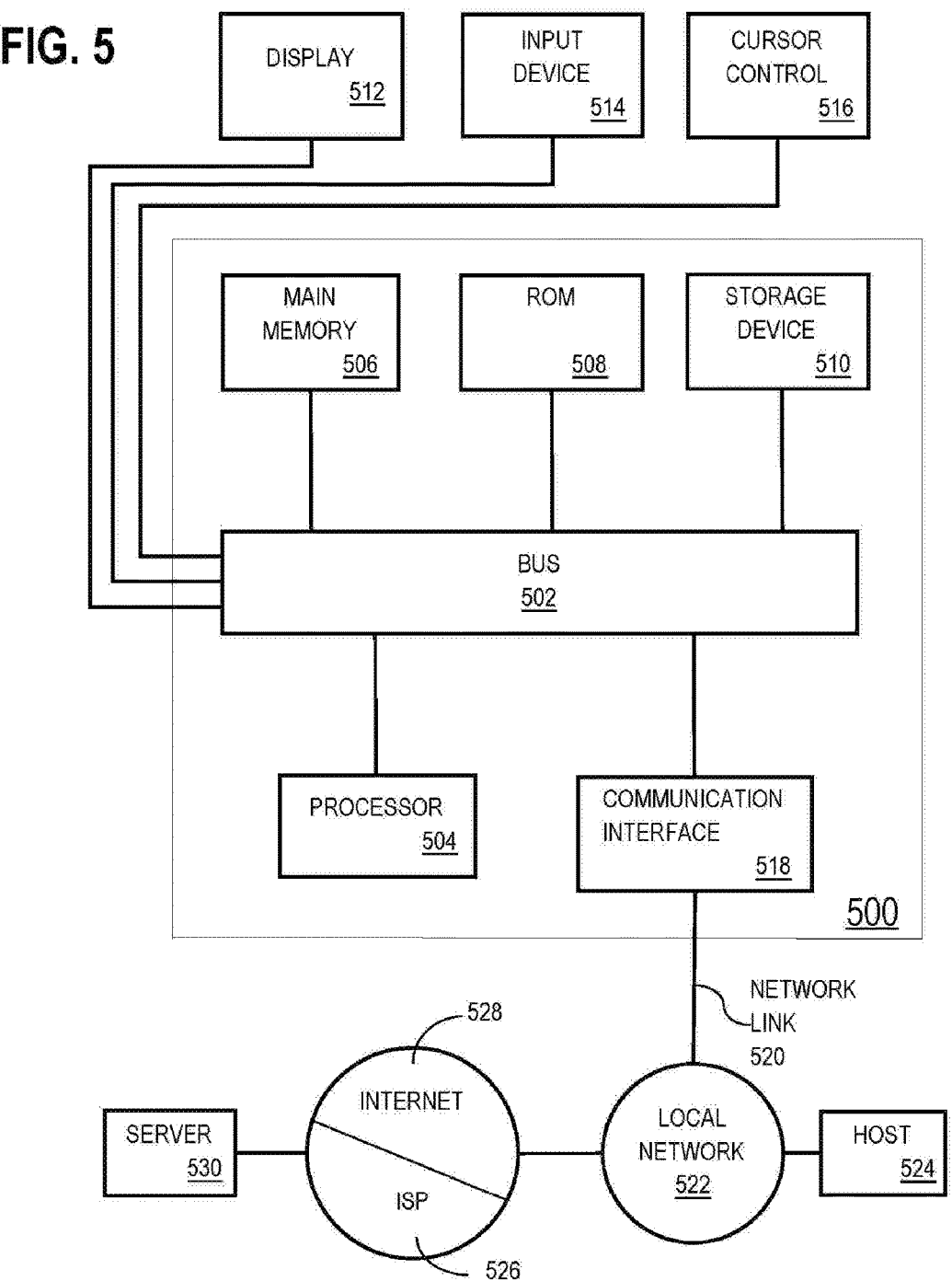

RUNTIME PERFORMANCE INTROSPECTION

TECHNICAL FIELD

The present disclosure relates to performance monitoring. In particular, the present disclosure relates to generating a report for diagnosing a performance hot spot.

BACKGROUND

In a computer system, performance can be measured in terms of factors such as response time, bandwidth, and utilization of computing resources. A performance hot spot is an area of software or hardware in which a large amount of time or computing resources are expended, in relation to other regions. Identifying and eliminating a hot spot in a system can improve performance system-wide.

An enterprise system is a computer system for managing operations on behalf of one or more tenants. An enterprise system may include servers, databases, and software for use by the tenants. A tenant may develop a set of applications for use in the enterprise system. For example, a tenant application may request data from a host database. In an enterprise system, hundreds of tenants may simultaneously execute thousands of applications. The applications may call millions of functions working across thousands of database tables. Accordingly, diagnosing performance issues can be difficult in an enterprise system.

A user may enable debug logging to help identify a source of a performance issue. When debug logging is enabled, operations, processes, and errors are recorded. A debug log may include information such as callouts to a database, resources used by a database, and sections of code executed. The debug log messages are typically written in a file system. Debug logging consumes disk Input/Output (I/O), which may affect performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example thread-local storage scheme in accordance with one or more embodiments;

FIGS. 4A-4C illustrate example user interfaces for configuring a threshold time period in accordance with one or more embodiments; and FIG. 5 illustrates a block diagram of a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RUNTIME PERFORMANCE INTROSPECTION SYSTEM
3. OPERATIONS FOR RUNTIME PERFORMANCE INTROSPECTION
4. THREAD-LOCAL VARIABLES
5. CONFIGURATION OF THE THRESHOLD PERIOD OF TIME
6. MISCELLANEOUS; EXTENSIONS
7. HARDWARE OVERVIEW

1. General Overview

One or more embodiments relate to diagnosing performance hot spots with minimal performance impact. A system selectively extracts a subset of in-memory application data, for failure analysis, based on application metadata associated with an application. The selective data extraction may be used to generate succinct reports that are customized to explore the specific vulnerabilities of each particular application. The selective data extraction has performance advantages over systems that extract all in-memory application data for analysis. The selective data extraction may be more efficient than extracting all trace logs for all data values.

In an embodiment, application metadata identifies application data attributes for value extraction. The application metadata may identify, for example, a client attribute. A value of the client attribute identifies the client which requested the execution of a failed operation or failed function thereof. The application metadata may identify a particular function, associated with an operation, that is to be analyzed in case of operation failure. Values associated with the particular function may be extracted based on the application metadata. The application metadata may identify a thread-local variable of a thread, executing an operation, that is to be analyzed in case of operation failure. A value associated with the thread-local variable of the thread may be extracted based on the application metadata.

One or more embodiments described in this Specification and/or recited in the claims may not be included in this General Overview section.

2. Runtime Performance Introspection System

Figure 1:
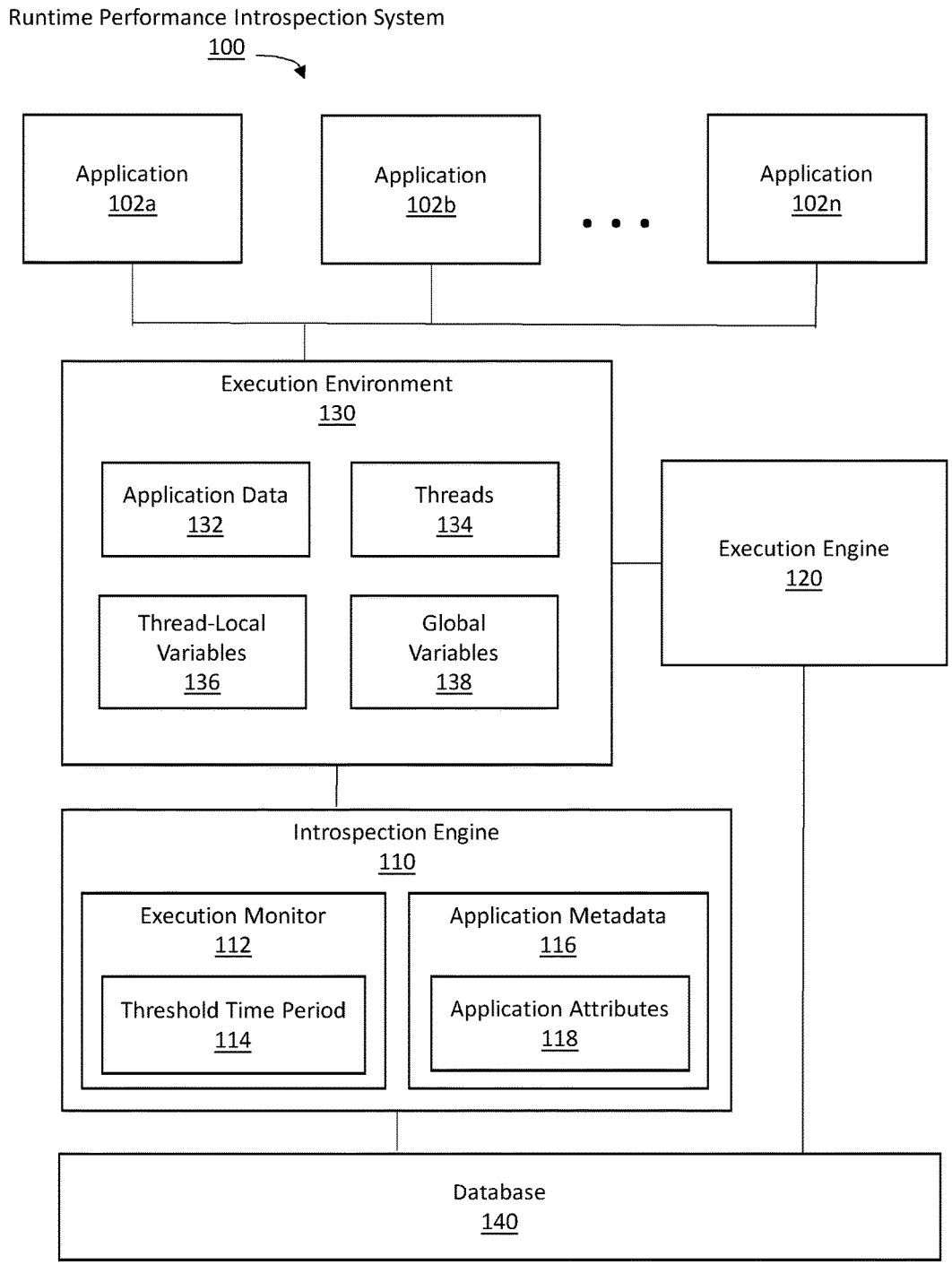
FIG. 1 illustrates a runtime performance introspection system in accordance with one or more embodiments.

FIG. 1 illustrates a system 100 in accordance with one or more embodiments. The runtime performance introspection system 100 is a system for identifying values associated with an operation that did not complete within a threshold period of time. The runtime performance introspection system 100 includes applications 102a-102n; execution environment 130; execution engine 120; introspection engine 110; and database 140. In one or more embodiments, the runtime performance introspection system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the execution environment 130 represents an execution platform. The execution environment may control the usage of computing and storage resources across the system 100. The execution environment 130 initiates the execution of operations. As an example, the execution environment 130 may control executing a query on a database. As another example, the execution environment 130 may control executing a computation.

The execution environment 130 may be implemented on middleware. Middleware is software which operates between applications, operating systems, and databases. An application may execute operations via instructions transmitted to or intercepted by middleware. Using a middleware-based execution environment, the system can facilitate computations and storage across a distributed computer network.

In one or more embodiments, the middleware may execute independently of the application. The middleware, executing independently of the application, may initiate the execution of an operation requested by the application. The middleware may execute operations on one or more specific operating systems by modifying operating-system-agnostic code retrieved from application data. The middleware may retrieve application code and encapsulate the application code in a wrapper corresponding to a particular operating system.

In one or more embodiments, the system includes multiple levels of middleware. The system may include logic middleware. Logic middleware executes operations such as application logic processing and computations. Logic middleware may execute operations in-memory. Additionally, the system may include data-manipulation middleware. Data-manipulation middleware executes operations such as retrieving data from a database, inserting data, updating data, and deleting data.

In one or more embodiments, the applications 102a, 102b, . . . 102n are software programs configured to execute one or more tasks. An application, e.g. application 102a, may manage the execution of an operation by transmitting a request to an external system. As an example, application 102a is communicatively coupled to middleware. Application 102a transmits a request to execute an operation to the middleware. The middleware causes a query to be executed based on the request.

In an embodiment, the threads 134 are processing units configured to execute tasks. A particular operation may include multiple threads 134. In the execution environment 130, multiple threads can be executed simultaneously. A program may execute in a multi-threaded fashion, wherein multiple threads 134 execute concurrently.

In one or more embodiments, the application data 132 is data associated with an application (e.g., applications 102a, 102b, . . . 102n). As an example, the application data 132 may include values, corresponding to variables, which are generated when the system executes an operation. As another example, the application data 132 may include the name of the application. As another example, the application data 132 may include a function associated with the application. As another example, the application data 132 may include the name of a user associated with the application.

The application data 132 may be stored across various locations. An application name may be stored in the call stack of a particular thread. A user name may be stored in the running stack within a login session. Application data may be stored to local memory.

In an embodiment, the global variables 138 are variables accessible throughout an application. A global variable 138 is accessible across multiple functions. For instance, "pi=3.14" may be defined for a particular application. The application is made up of several functions. As the functions execute and complete, the global variable pi continues to be defined. In a multi-threaded application, a global variable 138 is generally accessible across multiple threads. However, global variables 138 may be locked. A locked global variable may only be accessed by one thread at a time.

In an embodiment, thread-local variables 136 are variables which are only accessible to a particular thread. As an example, a multi-threaded application includes threads that manipulate the variable "quantity". Multiple threads may concurrently use quantity. By segregating the value of quantity across threads, one thread cannot interfere with another thread's use of quantity. A set of thread-local variables 136 may be stored to an array specific to a particular variable, as shown in FIG. 3. Alternatively, thread-local variables 136 may be stored to structures such as a linked list, a double-linked list, or a hash table.

A bind variable is a variable used as a placeholder. A bind variable corresponds to a dynamically bound value. As an example, a Structured Query Language (SQL) query may include the bind variable CustNo. CustNo represents a customer number. The value corresponding to CustNo may vary across query executions. The query is passed using the placeholder, CustNo, rather than a particular value. Replacing a value with a bind variable can reduce computation costs by eliminating duplicative parsing for related queries. The system may pass the query, with bind variables, to a particular Application Programming Interface (API) associated with the execution environment. Via the API, the system can bind the appropriate value as the query is executed.

In an embodiment, the application metadata 116 describes the application data 132. As an example, the application metadata 116 may specify a location for storing a particular variable. As another example, the application metadata 116 may specify a list of objects in a particular database. The application metadata 116 may be used to manage and/or manipulate the application data 132. The application metadata 116 may be used to manage the execution of operations associated with the application.

In an embodiment, the application attributes 118 (also referred to herein as "application data attributes") are application characteristics defined by the application metadata 116. As an example, an application attribute 118 may identify a user associated with an application. As another example, an application attribute 118 may identify a particular SQL query invoked in association with the application. As another example, an application attribute 118 may identify a client attribute which indicates the client which requested the execution of an operation.

In an embodiment, each application attribute 118 corresponds to application data 132. For a particular application attribute 118, application data representing a value of the application attribute is generated during execution of the operation. As an example, the application metadata 116 defines the application attribute 118 User Name. The system executes an operation associated with the application, generating a value for User Name: Bob Smith.

In an embodiment, the execution engine 120 includes software and/or hardware configured to execute an operation. The execution engine 120 may execute operations based on application code. The execution engine 120 may formulate and execute a query, such as a SQL query. The execution engine 120 may execute computations, such as adding numbers.

The execution engine 120 may execute a metadata installation. In a metadata installation, the execution engine 120 installs application metadata. The execution engine 120 may install the application metadata to a disk associated with the middleware. The metadata installation may include downloading object metadata to a file system. The metadata installation may include converting the object metadata to a file-based format for faster access. The metadata installation may include retrieving metadata application code. The metadata installation may include converting the application code to assembly format. The system may install and load the application metadata to the execution environment at runtime ("just-in-time installation").

In an embodiment, the execution monitor 112 is hardware and/or software configured to track the execution of an operation. The execution monitor may be diagnostic code injected into middleware code. The diagnostic code may be injected at an entry point to application code which calls a function or executes a database query. As an example, the diagnostic code is incorporated into a method which executes a query.

In an embodiment, the execution monitor tracks execution time at both the logic middleware level and at the data-manipulation middleware level. The system may inject execution-monitoring code into the logic middleware. The system may inject additional execution-monitoring code into the data manipulation middleware.

The execution monitor 112 may monitor an operation to detect a potential hot spot. The execution monitor may detect an operation failure. An operation may fail due to a crash. When an operation crashes, a process associated with the operation ceases to function properly and exits. An operation may fail due to a hang. A hanging operation ceases to process commands. An operation may fail due to an infinite loop (a "looping operation"). A looping operation repeats continuously without completing or exiting. Alternatively, or additionally, the execution monitor may determine the time taken to execute an operation.

In an embodiment, the execution monitor 112 determines whether an operation has completed within a threshold time period 114 (also referred to herein as "threshold period of time" and "execution time threshold"). The threshold time period 114 is a time period used in determining whether to collect application data corresponding to an operation. Generally, the threshold time period 114 corresponds to an execution time, for an operation, which is considered excessively long. The threshold time period may be configurable in association with a particular application or operation. As an example, a user may set a threshold time period 114 for a particular application, as shown in FIGS. 4A-4C. The threshold time period may be tailored based on factors such as the complexity of a query.

In an embodiment, the introspection engine 110 includes software and/or hardware configured to monitor performance in the system 100. The introspection engine may monitor the execution of operations via the execution monitor 112. The introspection engine may identify key application attributes 118 via application metadata 116. The introspection engine 110 may use the application metadata 116 to identify values corresponding to application attributes 118 defined by the application metadata 116. Based on the application metadata 116, the introspection engine 110 may extract values corresponding to selected application attributes.

In an embodiment, the database 140 corresponds to any local or remote storage device. Access to the database 140 may be restricted and/or secured. In an example, access to the database 140 requires authentication using passwords, certificates, and/or another suitable mechanism. Those skilled in the art will appreciate that elements or various portions of data stored in the database 140 may be distributed and stored in multiple data repositories. In one or more embodiments, the database 140 is flat, hierarchical, network based, relational, dimensional, object modeled, or structured otherwise. In an example, database 140 is maintained as a table of a SQL database and verified against other databases. Database 140 stores data associated with the applications 102a, 102b, . . . 102n.

3. Operations for Runtime Performance Introspection

Figure 2:
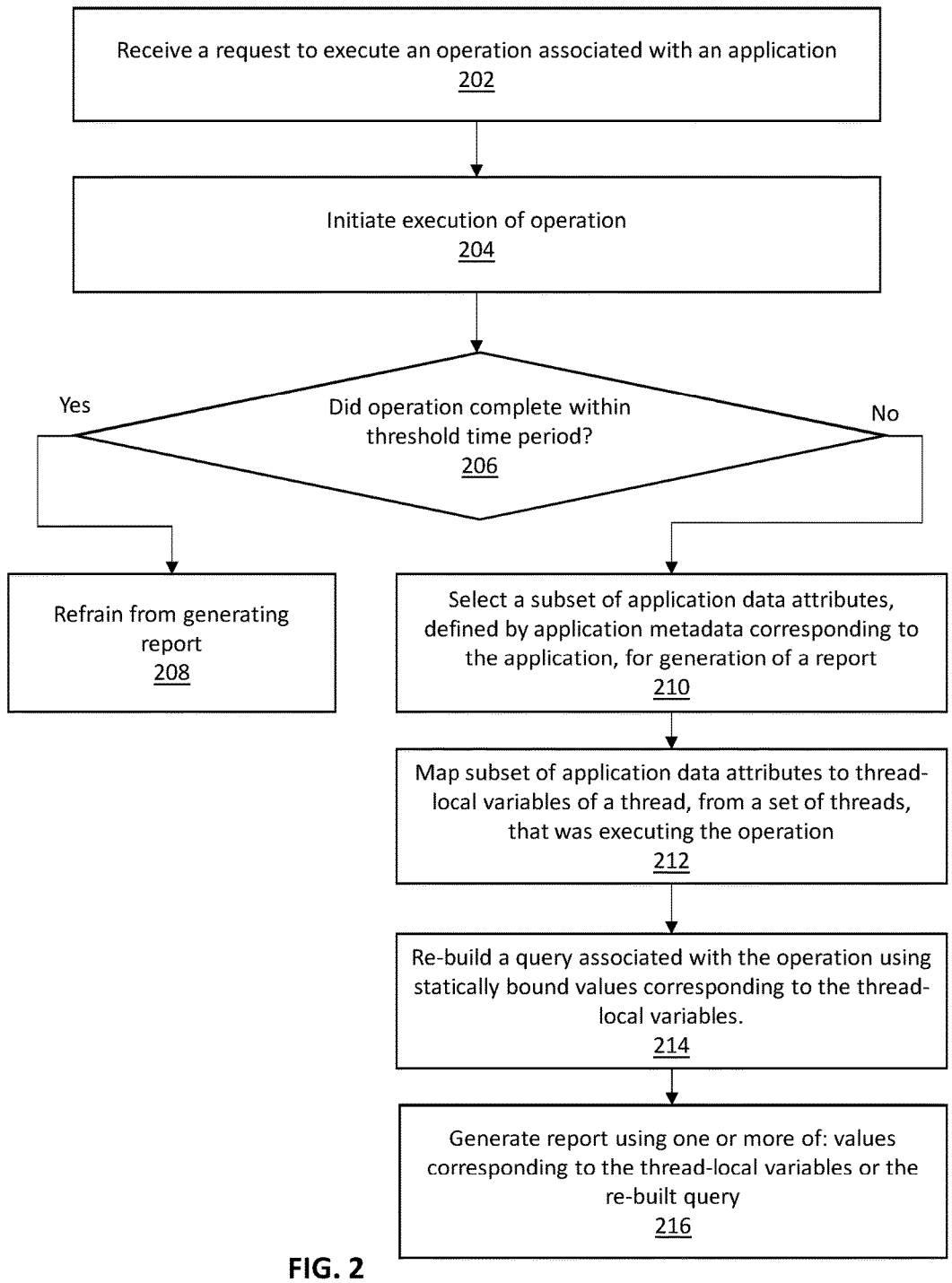
FIG. 2 illustrates an example set of operations for runtime performance introspection in accordance with one or more embodiments.

FIG. 2 illustrates an example set of operations for runtime performance introspection in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the execution environment receives a request to execute an operation associated with an application. (Operation 202). Middleware that is executing independently of the application may receive the request from the application. One level of middleware may request another level of middleware to execute an operation associated with an application. As an example, logic middleware may prepare to execute a computation by requesting data-manipulation middleware to retrieve a value from a database.

The execution environment obtains application metadata. The execution environment may obtain the application metadata via an API associated with the application. The execution environment may obtain the application metadata subsequent to receiving the request to execute the operation associated with the application. Alternatively, the execution environment may obtain the application metadata prior to receiving the request to execute the operation associated with the application.

In an embodiment, the execution environment initiates the execution of the operation (Operation 204). The execution environment may execute any initial tasks needed to execute the operation. The execution environment may allocate memory necessary for execution of the operation. The execution environment may build a query for execution. The execution environment may build the query using bind variables.

In an embodiment, the execution of the operation associated with the application results in generating and storing application data in memory. As an example, the execution environment executes an operation to determine an amount to charge a customer for a sale of goods. The execution environment retrieves quantity and cost values from a database. The execution environment stores the quantity and cost values in memory. The execution environment uses a function, associated with the application, to compute the amount to charge the customer. The execution environment multiplies the stored values to arrive at a value corresponding to the amount to charge the customer. The execution environment stores the value, corresponding to the amount to charge the customer, to memory. The execution environment further stores the name of the function and the name of the application to memory.

The operation may be executed with or without activating a debug log. In at least one embodiment, the debug log is not activated to ensure application performance is not degraded as a result of the debug log.

In an embodiment, the operation is synchronous. The system executes the operation in a blocking manner. The system waits until a thread returns a value, before a second operation may be executed. The same component that initiated the request processes the returned value.

Alternatively, the operation is asynchronous. The system may execute the operation across multiple threads. The system does not wait for a thread to return a value before executing operations on another thread. The system may concurrently execute multiple operations across multiple threads. When the thread returns a value, any component of the system can process the returned value.

In an embodiment, the execution monitor determines whether the operation completed within the threshold time period (Operation 206). The execution monitor may track the operation as the operation executes. The execution monitor may use a timer based on the threshold time period to determine whether the operation completed within the threshold time period. As the system initiates the execution of the operation, the execution monitor starts the timer. Once the threshold time period has elapsed, the execution monitor determines whether the operation has completed.

Alternatively, the execution monitor may determine an execution time for the operation, for comparison to the threshold time period. As an example, the execution monitor starts a timer when the operation is initiated. When the operation completes, the execution monitor records the execution time. The execution monitor compares the execution time for the operation to the threshold time period.

Alternatively, or additionally, the execution monitor may determine that an operation did not complete within the threshold time period by detecting an operation failure. The execution monitor may detect that a program has raised a signal or exception, indicating that an operation did not complete within the threshold time period.

In an embodiment, the introspection engine refrains from generating a report if the operation completed within the threshold time period (Operation 208). When an operation has completed within the threshold time period, the system moves on to the next operation to be executed. The system preserves resources by refraining from logging parameters which are not associated with a long-running operation.

If the system determines that the operation associated with the application did not complete within the threshold period of time, then the introspection engine gathers in-memory application data for generating a report (Operations 210-216). The introspection engine may select a subset of application data attributes for generation of the report (Operation 210). The introspection engine selects the subset of application data attributes based on application metadata corresponding to the application. As an example, the introspection engine identifies a user login session, available in memory, where a user name is stored. To select in-memory data attributes, the system need not log the information or parse logs in memory. Accordingly, the selected application data attributes need not include any debug log attributes.

In an embodiment, the introspection engine extracts values corresponding to the application data attributes. As an example, the application metadata specifies a particular thread in which a function is executing in association with the application. The introspection engine executes a stack trace for the thread. Via the stack trace, the introspection engine extracts a value corresponding to the name of the function.

In an embodiment, the middleware controls the execution of operations across multiple hardware types and multiple operating systems. Each operating system uses a unique stack trace tool. The middleware executes a stack trace across the multiple operating systems using a wrapper API. Via the wrapper API, the middleware uses the appropriate commands to execute a stack trace in the pertinent operating system.

In an embodiment, the introspection engine maps a subset of application data attributes to thread-local variables of a thread that was executing the operation (Operation 212). The introspection engine identifies a thread, of a set of threads, that executed the operation. The introspection engine may identify the thread based on the application metadata. As an example, the application metadata specifies that a variable is stored in thread-level storage at offset 10, corresponding to thread 10.

In an embodiment, the introspection engine extracts values based on the mapping of application data attributes to thread-local variables of a thread. The introspection engine determines a value, stored in memory, for a thread-local variable identified as corresponding to a particular application data attribute. The application metadata may specify a particular offset, in the thread-local storage, at which the variable is stored. The introspection engine extracts, from the memory, the value for the thread-local variable.

In an embodiment, the introspection engine refrains from extracting values for other thread-local variables. The introspection engine may identify a selected thread-local variable and an unselected thread-local variable. Both thread-local variables are stored in a same data structure. The introspection engine extracts a value for the selected thread-local variable. The introspection engine refrains from extracting a value for the unselected thread-local variable. The selected thread-local variable and the unselected thread-local variable may both be associated with a same thread. Alternatively, the selected thread-local variable and the unselected thread-local variable may be associated with two different threads.

In an embodiment, the introspection engine re-builds a query associated with the operation using statically bound values corresponding to the thread-local variables (Operation 214). The introspection engine may re-build the query by replacing a dynamically bound value in the query with a statically bound value. As an example, the execution engine executes a query which has been built for execution using bind variables. Upon determining that the query is not executing within the threshold time period, the introspection engine rebuilds the query for reporting. For reporting, the introspection engine identifies values with which to replace the bind variables. The introspection engine rebuilds the query with the literal value for reporting purposes. Accordingly, analysis of the rebuilt query can be done through a query analysis tool with statically bound values. Analysis of the rebuilt query will not require the query to execute via any particular API.

In an embodiment, the system generates a report (Operation 216). The report is based on values of the application data attributes identified by the application metadata. The report is not based on any values of application data attributes not identified by the application metadata.

In an embodiment, the report may include data gathered from several sources and memory structures. The report may include one or more values corresponding to the thread-local variables. The report may include the re-built query. The report may include the name of the user executing the application. The report may include stack data identifying function calls associated with the operation.

The system may transmit the report to an administrator for diagnosis. The system may recursively create and transmit reports as multiple faults are diagnosed.

The following detailed example illustrates operations in accordance with one or more embodiments. The following detailed example should not be construed as limiting the scope of any of the claims. Middleware of an enterprise system receives 100 requests, from 20 applications, to execute 100 SQL queries. The middleware initiates execution of each query by building the query with bind variables and executing the query on the database.

The middleware injects execution-monitoring code inline to the query execution instructions for each query. As each query is executed on the database, the execution monitor times the execution of the query. The execution monitor identifies a respective threshold execution time of 1 second for each SQL query. The first 99 queries execute in less than 1 second. Accordingly, the middleware rapidly moves on to the next query in each case, without tracking performance data for the first 99 queries.

The execution monitor determines that the hundredth query has executed in 5 seconds. Accordingly, the execution monitor determines that the hundredth query has not executed within the threshold execution time (i.e., a performance hotspot is identified in the enterprise system).

The introspection engine collects data for inclusion in a report for diagnosis of the performance hotspot. The introspection engine identifies application metadata corresponding to the application. The application metadata defines application data attributes. The application metadata further specifies where values corresponding to the attributes are stored. The introspection engine selects four application data attributes for inclusion in the report: Application Name, User Name, SQL Query, and Functions.

Application Name corresponds to the name of the application. The application name is a global variable stored to memory. Based on the application metadata, the introspection engine identifies the variable specifying the application name: New Order.

User Name corresponds to the name of a user requesting execution of the application. The user name is a thread-local variable stored in a linked list in memory. Based on the application metadata, the introspection engine identifies a thread number, 11, associated with the application. The introspection engine maps thread 11 to offset 11 in the linked list. The introspection engine identifies a user name, John Doe, at offset 11. John Doe corresponds to the user requesting execution of the application.

SQL Query corresponds to a SQL query associated with the performance hotspot. The introspection engine identifies the query being executed. The query being executed includes bind variables. Based on the application metadata, the introspection engine identifies an array containing values corresponding to the bind variables in this execution of the query. The introspection engine re-builds the query with the values, for reporting.

Functions corresponds to functions being called in association with the performance hotspot. The introspection engine executes a stack trace, selectively including only functions being called in association with the 100$^{th}$ operation. The functions, associated with the 100$^{th}$ operation, are printed for inclusion in the report.

The introspection engine prepares a report, including the values corresponding to Application Name, User Name, SQL Query, and Functions. The system transmits the report to an administrator associated with the application for diagnosis.

4. Thread-Local Variables

FIG. 3 illustrates an example configuration of thread-local variables in accordance with one or more embodiments. Eight different threads 302, labeled T1-T8, are executing.

Thread-local variables are stored to arrays 304, 306. Array 304 stores values, corresponding to each respective thread, for the variable Item. For thread T1, the variable Item corresponds to the value Pencil (1A). For thread T2, the variable Item corresponds to the value Stapler (2A). For thread T3, the variable Item corresponds to the value Paper (3A). For thread T4, the variable Item corresponds to the value Staples (4A). For thread T5, the variable Item corresponds to the value Pen (5A). For thread T6, the variable Item corresponds to the value Toner (6A). For thread T7, the variable Item corresponds to the value Pen (7A). For thread T8, the variable Item corresponds to the value Clipboard (8A).

Array 306 stores values for the variable Quantity, corresponding to each respective thread. For thread T1, the variable Quantity corresponds to the value 100 (1B). For thread T2, the variable Quantity corresponds to the value 50 (2B). For thread T3, the variable Quantity corresponds to the value 500 (3B). For thread T4, the variable Quantity corresponds to the value 750 (4B). For thread T5, the variable Quantity corresponds to the value 50 (5B). For thread T6, the variable Quantity corresponds to the value 5 (6B). For thread T7, the variable Quantity corresponds to the value 200 (7B). For thread T8, the variable Quantity corresponds to the value 50 (8B).

The system stores a copy of each variable for each respective thread. Each thread can access the variable via the respective memory slot in the thread-local storage. Each thread can access variables corresponding to the thread without a lock. In contrast, if each thread had access to a global variable, a synchronized lock would be used to prevent other threads from modifying the variable. Each thread would have to wait to gain access to the variable. Accordingly, thread-local storage can be used to improve performance.

5. Configuration of the Threshold Time Period

In an embodiment, the threshold time period is configurable. The system may present a User Interface (UI) for accepting user input to modify the threshold time period. As an example, a user may wish to set a long threshold time period to address major performance issues. The user may wish to set a shorter threshold time period to address relatively minor performance issues.

A. Function Execution Time Threshold

FIG. 4A shows an example UI for configuring a function execution time threshold 402. The function at issue is a Base Sales Price Function (BSFN). The BSFN may be used by an application to determine a base sales price.

The system displays a UI for configuring the threshold time period corresponding to the BSFN, indicated by the field "INI Entry: BSFNExecutionTimeThreshold" (408). The default value 410, for the BSFN execution time threshold, is set to 0 seconds. With a threshold execution time of 0 seconds, the system does not store any application parameter values.

The UI also displays an INI filename path 404. The INI filename path 404 is the path to the configuration file to which the threshold time period value is to be stored. The INI entry 404 is stored to the path /u01/jde920/e920/ini/JDE.INI. The INI section name 406 is a section in the configuration file corresponding to the BSFN execution time threshold 408. In this case, the INI section name 406 is DEBUG. Using the specified path 404 and section name 406, the system can accept user input adjusting the value stored for the execution threshold time. Alternatively, or additionally, the system may display UI elements to accept user input to modify the threshold execution time value (not pictured). As examples, the UI may enable a user to type in a value, or use a slider bar to select a value.

As indicated in the explanation 412, when the BSFN execution time threshold 408 is set to a value greater than 0, any server process that executes a BSFN that equals or exceeds the BSFN execution time threshold value will log a message. The log message will specify the user that requested execution of the BSNF. The log message will further specify a price level associated with the BSFN.

B. SQL Query Execution Time Threshold

FIG. 4B shows an example UI for configuring a query execution time threshold 414. The query at issue is a SQL query. The query may be called by an application to retrieve stored data.

The system displays a UI for configuring a threshold time corresponding to the SQL query, indicated by the field "INI Entry: QueryExecutionTimeThreshold" (420). The default value 422, for the BSFN execution time threshold, is set to 0 seconds. With a threshold execution time of 0 seconds, the system does not store any application parameter values.

The dialog also displays an INI filename path 416. The INI filename path 416 is the path to the configuration file to which the threshold time period value is to be stored. The INI entry 416 is stored to the path /u01/jde920/e920/ini/JDE.INI. The INI section name 418 is a section in the configuration file corresponding to the query execution time threshold 420. In this case, the INI section name 418 is DB SYSTEM SETTINGS. Using the specified path 416 and section name 418, the system can accept user input adjusting the value stored for the execution threshold time. Alternatively, or additionally, the system may display UI elements to accept user input to modify the threshold execution time value (not pictured). As examples, the UI may enable a user to type in a value, or use a slider bar to select a value.

As indicated in the explanation 424, when the query execution time threshold 420 is set to a value greater than 0, any server process that executes a query that equals or exceeds the query execution time threshold value will log a message. The log message will specify the end user that requested execution of the query. The log message will further specify the database proxy user that requested execution of the query. The log message will further specify the SQL query.

C. Metadata Execution Time Threshold

FIG. 4C shows an example UI for configuring a metadata execution time threshold 426. The metadata execution may be a metadata installation.

The system displays a UI for configuring a threshold time corresponding to the metadata process, indicated by the field "INI Entry: ExecutionTimeThreshold" (432). The default value for the execution time threshold is set to 0 seconds. With a threshold execution time of 0 seconds, the system does not store any application parameter values.

The dialog also displays an INI filename path 428. The INI filename path 428 is the path to the configuration file to which the threshold time period value is to be stored. The INI entry 432 is stored to the path /u01/jde920/e920/ini/JDE.INI. The INI section name 430 is a section in the configuration file corresponding to the execution time threshold 432. In this case, the INI section name 430 is METADATA. Using the specified path 428 and section name 430, the system can accept user input adjusting the value stored for the execution threshold time. Alternatively, or additionally, the system may display UI elements to accept user input to modify the threshold execution time value (not pictured). As examples, the UI may enable a user to type in a value, or use a slider bar to select a value.

As indicated in the explanation 436, when the execution time threshold 432 is set to a value greater than 0, any metadata kernel process that equals or exceeds the execution time threshold value will log a message.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 450 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause:
   receiving a request to execute an operation associated with an application;

initiating execution of the operation associated with the application, wherein execution of the operation associated with the application results in generating and storing application data in memory;

determining that the operation associated with the application did not complete within a threshold period of time;

responsive to determining that the operation associated with the application did not complete within the threshold period of time:

selecting a first subset of application data attributes, defined by application metadata corresponding to the application, for generation of a report, without selecting a second subset of the application data attributes that has not been identified by the application metadata;

extracting, from the application data stored in memory, values of the first subset of the application data attributes identified by the application metadata;

wherein extracting comprises:

identifying a first thread, of a plurality of threads, that executed the operation associated with the application;

identifying a first thread-local variable associated with the first thread and corresponding to an application data attribute of the first subset of application data attributes;

determining a value, stored in the memory, for the first thread-local variable; and extracting, from the memory, the value for the first thread-local variable without extracting a value for a second thread-local variable associated with the first thread; and generating a report that is (a) based on the values of the first subset of the application data attributes identified by the application metadata; and (b) not based on any values of the second subset of the application data attributes.

2. The media of claim 1, wherein the value for the first thread-local variable and the value for the second thread-local variable are stored in a same data structure.

3. The media of claim 1, wherein the value for the first thread-local variable and the value for the second thread-local variable are stored in a same data structure.

4. The media of claim 1, wherein the receiving and initiating operations are executed by middleware that is executing independently of the application.

5. The media of claim 1, wherein the instructions further cause obtaining the application metadata, defining the first subset of application data attributes, prior to receiving the request to execute the operation associated with the application.

6. The media of claim 1, wherein the values of the first subset of application data attributes comprise values generated during the execution of the operation.

7. The media of claim 1, wherein the application data attributes define a particular call stack associated with the application.

8. The media of claim 1, wherein initiating execution of the operation comprises initiating execution of the operation without activating a debug log.

9. The media of claim 1, wherein the first subset of application data attributes does not include any debug log attributes.

10. The media of claim 1, wherein the instructions further cause:

determining a threshold execution time;

comparing an execution time of the operation to the threshold execution time;

determining that the execution time of the operation exceeds the threshold execution time; and determining that operation did not complete within a threshold period of time, based on the execution time of the operation exceeding the threshold execution time.

11. The media of claim 1, wherein the operation associated with the application did not complete within a threshold period of time due to either: a hang, a loop, or a crash.

12. The media of claim 1, wherein the operation associated with the application is executing a database query.

13. The media of claim 1, wherein the operation associated with the application is a metadata installation.

14. The media of claim 1, wherein the operation associated with the application is executing application code.

15. A method comprising:

receiving a request to execute an operation associated with an application;

initiating execution of the operation associated with the application, wherein execution of the operation associated with the application results in generating and storing application data in memory;

determining that the operation associated with the application did not complete within a threshold period of time;

responsive to determining that the operation associated with the application did not complete within the threshold period of time:

selecting a first subset of application data attributes, defined by application metadata corresponding to the application, for generation of a report, without selecting a second subset of the application data attributes that has not been identified by the application metadata;

extracting, from the application data stored in memory, values of the first subset of the application data attributes identified by the application metadata;

wherein extracting comprises:

identifying a first thread, of a plurality of threads, that executed the operation associated with the application;

identifying a first thread-local variable associated with the first thread and corresponding to an application data attribute of the first subset of application data attributes;

determining a value, stored in the memory, for the first thread-local variable; and extracting, from the memory, the value for the first thread-local variable without extracting a value for a second thread-local variable associated with the first thread; and generating a report that is (a) based on the values of the first subset of the application data attributes identified by the application metadata; and (b) not based on any values of the second subset of the application data attributes;

wherein the method is performed by at least one device including a hardware processor.

16. One or more non-transitory machine-readable media storing instructions which, when executed by one or more hardware processors, cause:

receiving a request to execute an operation associated with an application;

initiating execution of the operation associated with the application, wherein execution of the operation associated with the application results in generating and storing application data in memory;
determining that the operation associated with the application did not complete within a threshold period of time;
responsive to determining that the operation associated with the application did not complete within the threshold period of time:
selecting a first subset of application data attributes, defined by application metadata corresponding to the application, for generation of a report, without selecting a second subset of the application data attributes that has not been identified by the application metadata;
extracting, from the application data stored in memory, values of the first subset of the application data attributes identified by the application metadata;
wherein extracting comprises:
identifying a first thread, of a plurality of threads, that executed the operation associated with the application;
identifying a first thread-local variable associated with the first thread and corresponding to an application data attribute of the first subset of application data attributes;
determining a value, stored in the memory, for the first thread-local variable; and
extracting, from the memory, the value for the first thread-local variable without extracting a value for a second thread-local variable associated with a second thread; and
generating a report that is (a) based on the values of the first subset of the application data attributes identified by the application metadata; and (b) not based on any values of the second subset of the application data attributes.

17. One or more non-transitory machine-readable media storing instructions which, when executed by one or more hardware processors, cause:
receiving a request to execute an operation associated with an application;
initiating execution of the operation associated with the application, wherein execution of the operation associated with the application results in generating and storing application data in memory;
determining that the operation associated with the application did not complete within a threshold period of time;
responsive to determining that the operation associated with the application did not complete within the threshold period of time:
rebuilding a first query corresponding to the operation by replacing a dynamically bound value in the first query with a statically bound value to generate a second query;
selecting a first subset of application data attributes, defined by application metadata corresponding to the application, for generation of a report, without selecting a second subset of the application data attributes that has not been identified by the application metadata;
extracting, from the application data stored in memory, values of the first subset of the application data attributes identified by the application metadata; and
generating a report that is (a) based on the values of the first subset of the application data attributes identified by the application metadata; and (b) not based on any values of the second subset of the application data attributes;
wherein generating the report is further based on the second query.

18. A method comprising:
receiving a request to execute an operation associated with an application;
initiating execution of the operation associated with the application, wherein execution of the operation associated with the application results in generating and storing application data in memory;
determining that the operation associated with the application did not complete within a threshold period of time;
responsive to determining that the operation associated with the application did not complete within the threshold period of time:
selecting a first subset of application data attributes, defined by application metadata corresponding to the application, for generation of a report, without selecting a second subset of the application data attributes that has not been identified by the application metadata;
extracting, from the application data stored in memory, values of the first subset of the application data attributes identified by the application metadata;
wherein extracting comprises:
identifying a first thread, of a plurality of threads, that executed the operation associated with the application;
identifying a first thread-local variable associated with the first thread and corresponding to an application data attribute of the first subset of application data attributes;
determining a value, stored in the memory, for the first thread-local variable; and
extracting, from the memory, the value for the first thread-local variable without extracting a value for a second thread-local variable associated with a second thread; and
generating a report that is (a) based on the values of the first subset of the application data attributes identified by the application metadata; and (b) not based on any values of the second subset of the application data attributes;
wherein the method is performed by at least one device including a hardware processor.

19. A method comprising:
receiving a request to execute an operation associated with an application;
initiating execution of the operation associated with the application, wherein execution of the operation associated with the application results in generating and storing application data in memory;
determining that the operation associated with the application did not complete within a threshold period of time;
responsive to determining that the operation associated with the application did not complete within the threshold period of time:
rebuilding a first query corresponding to the operation by replacing a dynamically bound value in the first query with a statically bound value to generate a second query;
selecting a first subset of application data attributes, defined by application metadata corresponding to the application, for generation of a report, without selecting a second subset of the application data attributes that has not been identified by the application metadata;

extracting, from the application data stored in memory, values of the first subset of the application data attributes identified by the application metadata; and generating a report that is (a) based on the values of the first subset of the application data attributes identified by the application metadata; and (b) not based on any values of the second subset of the application data attributes;

wherein generating the report is further based on the second query; and wherein the method is performed by at least one device including a hardware processor.

* * * * *